United States Patent
Jang et al.

(10) Patent No.: US 10,496,097 B2
(45) Date of Patent: Dec. 3, 2019

(54) METHOD AND APPARATUS FOR CONTROLLING DRIVING OF VEHICLE

(71) Applicant: SAMSUNG ELECTRONICS CO., LTD., Suwon-si (KR)

(72) Inventors: Cheolhun Jang, Pohang-si (KR); Paulbarom Jeon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 43 days.

(21) Appl. No.: 15/833,595

(22) Filed: Dec. 6, 2017

(65) Prior Publication Data

US 2019/0049964 A1 Feb. 14, 2019

(30) Foreign Application Priority Data

Aug. 9, 2017 (KR) .................. 10-2017-0100932

(51) Int. Cl.
*G06K 9/00* (2006.01)
*G05D 1/00* (2006.01)
(Continued)

(52) U.S. Cl.
CPC ..... *G05D 1/0088* (2013.01); *B60W 30/18154* (2013.01); *G05D 1/0246* (2013.01);
(Continued)

(58) Field of Classification Search
CPC .. G05D 1/0088; G05D 1/0246; G05D 1/0212; G05D 1/0214; G05D 1/0223; G05D 1/021; G06K 9/00201; G06K 9/00798; G06K 9/00818; G06K 9/00825; G06K 9/6201; G06K 9/00651; G06K 9/00791; G06K 9/00805; G06K 2209/23; G06T 7/73; G06T 7/60; G06T 2207/30248; G06T 2207/30252; G06T 2207/60256; G06T 2207/60261; G06T 2207/60236; B60W 30/18154; B60W 30/0956; B60W 30/16;
(Continued)

(56) References Cited

U.S. PATENT DOCUMENTS 9,616,887 B2 4/2017 Takagi
10,332,401 B2 * 6/2019 Zruya .................. G08G 1/0965
(Continued)

FOREIGN PATENT DOCUMENTS

JP 2012-53749 A 3/2012
JP 2014-28543 A 2/2014
(Continued)

OTHER PUBLICATIONS

Communication dated Nov. 14, 2018 issued by the European Patent Office in counterpart European Application No. 18166610.8.

*Primary Examiner* — Jose L Couso
(74) *Attorney, Agent, or Firm* — Sughrue Mion, PLLC

(57) ABSTRACT

A method and apparatus to control driving of a vehicle is provided. To control driving of a vehicle, the method and apparatus obtain traffic information related to an intersection in response to a position of the vehicle being at a predetermined proximity to the intersection, and obtain driving information related to another vehicle driving in front of and in the same direction as the vehicle. the vehicle by determining whether the vehicle is to enter the intersection based on the traffic information and the driving information.

14 Claims, 11 Drawing Sheets

(51) Int. Cl.
*B60W 30/18* (2012.01)
*G06K 9/62* (2006.01)
*G06T 7/73* (2017.01)
*G05D 1/02* (2006.01)
*G06T 7/60* (2017.01)
*G08G 1/095* (2006.01)

(52) U.S. Cl.
CPC ..... *G06K 9/00201* (2013.01); *G06K 9/00798* (2013.01); *G06K 9/00818* (2013.01); *G06K 9/00825* (2013.01); *G06K 9/6201* (2013.01); *G06T 7/60* (2013.01); *G06T 7/73* (2017.01); *G08G 1/095* (2013.01); *B60K 2370/175* (2019.05); *B60W 2550/22* (2013.01); *B60W 2550/302* (2013.01); *B60W 2550/306* (2013.01); *B60W 2550/308* (2013.01); *G05D 2201/0213* (2013.01); *G06T 2207/30236* (2013.01); *G06T 2207/30256* (2013.01)

(58) Field of Classification Search
CPC .... B60W 30/17; B60W 30/14; B60W 30/143; B60W 30/18027; B60W 30/18145; B60W 2550/22; B60W 2550/302; B60W 2550/306; B60W 2550/308; B60W 2550/30; B60W 2550/10; B60W 2550/146; B60W 2550/106; B60W 2550/00; B60W 2550/141; B60W 2550/402; B60W 2750/308; B60W 2900/00; B60W 2420/42; B60W 2710/0605; G08G 1/095; G08G 1/167; G08G 1/166; G08G 1/096725; G08G 1/09675; G08G 1/096827; G08G 1/096844; G08G 1/096861; G01S 13/865; G01S 13/867; G01S 13/931; G01S 17/89; G01S 17/936; G01S 2013/9325; B60K 31/0058; B60R 1/00; B60R 2300/302; B60R 2300/804; B60R 2300/806; B60R 2300/8086; G01C 21/26; G01C 21/32; G01C 21/3658; G01C 21/00; G01C 21/005; G01C 21/20; G01C 21/28; G01C 21/30; G01C 21/34; G01C 21/3407; G01C 21/3415; G01C 21/3423; G01C 21/3461; G01C 21/3492; G01C 21/36; G01C 21/3602

See application file for complete search history.

(56) References Cited

U.S. PATENT DOCUMENTS

| | | | |
|---|---|---|---|
| 2010/0299000 | A1* | 11/2010 | Nakamura ................ B60R 1/00 701/1 |
| 2012/0143395 | A1* | 6/2012 | Yamada ................ B60W 40/08 701/1 |
| 2014/0330479 | A1 | 11/2014 | Dolgov et al. |
| 2016/0114800 | A1 | 4/2016 | Shimizu |
| 2016/0328975 | A1* | 11/2016 | Tokita .................... B60W 30/09 |
| 2017/0032197 | A1* | 2/2017 | Sim .......................... B60R 1/00 |
| 2017/0166124 | A1* | 6/2017 | Nakagawa ............. B60Q 9/008 |
| 2017/0256167 | A1* | 9/2017 | Kim .................. G08G 1/096783 |
| 2017/0267178 | A1* | 9/2017 | Shiga ..................... B60R 11/02 |
| 2017/0313297 | A1* | 11/2017 | Okada ..................... G08G 1/09 |
| 2018/0099665 | A1* | 4/2018 | You ....................... B60Q 9/008 |
| 2018/0182247 | A1* | 6/2018 | Baba ................. G06K 9/00791 |
| 2019/0122548 | A1* | 4/2019 | Sakuma ................ G08G 1/096 |
| 2019/0126920 | A1* | 5/2019 | You ....................... B60Q 9/008 |

FOREIGN PATENT DOCUMENTS

| | | | |
|---|---|---|---|
| JP | 2016-122362 | A | 7/2016 |
| JP | 6128218 | B2 | 5/2017 |
| KR | 2000-0067333 | A | 11/2000 |
| KR | 10-1029096 | B1 | 4/2011 |
| KR | 10-2011-0070693 | A | 6/2011 |
| KR | 10-1287585 | B1 | 7/2013 |
| KR | 10-1362706 | B1 | 2/2014 |
| KR | 10-2014-0104515 | A | 8/2014 |
| KR | 10-2014-0131226 | A | 11/2014 |
| KR | 10-1664582 | B1 | 10/2016 |
| KR | 10-2016-0132789 | A | 11/2016 |
| KR | 10-2017-0030816 | A | 3/2017 |
| KR | 10-1717938 | B1 | 3/2017 |
| WO | 2004/068439 | A1 | 8/2004 |

* cited by examiner

900

METHOD AND APPARATUS FOR
CONTROLLING DRIVING OF VEHICLE

CROSS-REFERENCE TO RELATED
APPLICATIONS

This application claims the benefit under 35 USC § 119(a) of Korean Patent Application No. 10-2017-0100932 filed on Aug. 9, 2017 in the Korean Intellectual Property Office, the entire disclosure of which is incorporated herein by reference for all purposes.

BACKGROUND

1. Field

The following description relates to a method and an apparatus to control driving of a vehicle through an intersection on a road.

2. Description of Related Art

An autonomous vehicle autonomously determines a driving route by recognizing its surrounding environment while independently being driven using its own power. The autonomous vehicle autonomously reaches a destination by maintaining a distance from an obstacle existing on the route and adjusting a speed and a driving direction based on a shape of the road, without a driver controlling a steering wheel, an accelerator, and a brake. For example, the autonomous vehicle accelerates in a straight section of the road and slows down while changing the driving direction based on a curvature of a curved section of the road.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an aspect, there is provided a method to control driving of a vehicle, including: obtaining traffic information related to an intersection in response to a position of the vehicle being at a predetermined proximity to the intersection; obtaining driving information related to another vehicle driving in front of and in the same direction as the vehicle; and controlling the vehicle by determining whether the vehicle may be to enter the intersection based on the traffic information and the driving information.

The controlling may include: controlling the vehicle to not enter the intersection in response to determining that the other vehicle may be driving at a speed less than or equal to the preset speed based on the driving information.

The other vehicle may be positioned on the same lane as the vehicle.

The controlling of the vehicle to not enter the intersection may include determining a stop position of the vehicle.

The determining of the stop position of the vehicle may include determining a position closer to the vehicle to be the stop position, the position closer to the vehicle being one of a limit position on a road at which a signal of a traffic light at the intersection may be identifiable and a position of a stop line on the road.

The method may further include: calculating the limit position.

The calculating may include: identifying the traffic light based on a captured image of the other vehicle; calculating a distance from the ground to the identified traffic light based on a size of the traffic light; and calculating the limit position based on the distance from the ground to the traffic light and a field of view (FOV) of a camera used to capture the image.

The calculating of the distance from the ground to the traffic light may include: detecting a pixel of the identified traffic light among pixels of the image; calculating an actual length indicated by a single pixel of the image based on a preset actual length of the traffic light; identifying a pole of the traffic light based on the image; and calculating a height of the pole of the traffic light based on the pole of the traffic light and the actual length indicated by the single pixel.

The method may further include: determining whether the vehicle may be approaching the intersection, wherein the determining of whether the vehicle may be approaching the intersection may include either one or both of: determining whether the vehicle may be approaching the intersection based on the position of the vehicle and a proceeding direction of the vehicle; and determining whether the vehicle may be approaching the intersection based on a captured image of a front side of the vehicle.

The controlling may include controlling the vehicle to not enter the intersection in response to a traffic signal obtained based on the traffic information being a stop signal.

In accordance with an aspect, there may be provided a non-transitory computer-readable storage medium storing instructions that, when executed by a processor, cause the processor to perform the method described above.

In accordance with an aspect, there may be provided a method to control driving of a vehicle, the method stored in a data processor of the vehicle, the method configured to control the data processor to perform: obtaining traffic information related to an intersection in response to a position of the vehicle being at a predetermined proximity to the intersection; obtaining driving information related to another vehicle driving in front of and in the same direction as the vehicle; and controlling the vehicle by determining whether the vehicle may be to enter the intersection based on the traffic information and the driving information.

In accordance with an aspect, there may be provided an apparatus to control driving of a vehicle, including: a processor configured to: obtain traffic information related to an intersection in response to a position of the vehicle being at a predetermined proximity to the intersection; obtain driving information related to another vehicle driving in front of and in the same direction as the vehicle; and control the vehicle by determining whether the vehicle may be to enter the intersection based on the traffic information and the driving information.

The controlling may include: controlling the vehicle to not enter the intersection in response to determining that the front side vehicle may be driving at a speed less than or equal to the preset speed.

The front side vehicle may be positioned on the same lane as the vehicle.

The controlling of the vehicle to not enter the intersection may include determining a stop position of the vehicle.

The determining of the stop position of the vehicle may include determining a position closer to the vehicle to be the stop position, the position closer to the vehicle being one of a limit position on a road at which a signal of a traffic light at the intersection may be identifiable and a position of a stop line on the road.

The processor may be further configured to calculate the limit position.

The processor may be configured to calculate the limit position by: identifying the traffic light based on a captured image of the other vehicle; calculating a distance from the ground to the identified traffic light based on a size of the traffic light; and calculating the limit position based on the distance from the ground to the traffic light and a field of view (FOV) of a camera used to capture the image.

The processor may be configured to calculate the distance from the ground to the traffic light by: detecting a pixel of the identified traffic light among pixels of the image; calculating an actual length indicated by a single pixel of the image based on a preset actual length of the traffic light; identifying a pole of the traffic light based on the image; and calculating a height of the pole of the traffic light based on the pole of the traffic light and the actual length indicated by the single pixel.

The apparatus may further include: a memory configured to store a method to control driving of the vehicle.

In accordance with an aspect, there may be provided a method performed at a processor configured to control driving of a vehicle, the method including: determining a position of the vehicle being at a preset distance from an intersection; obtaining traffic information including a traffic signal and a traffic sign; obtaining driving information related to another vehicle in front of the vehicle, wherein the driving information may include one of an absolute speed of the other vehicle, an absolute velocity of the other vehicle, and a relative speed between the vehicle and the other vehicle; preventing the vehicle from entering the intersection based on the traffic information and the driving information being within a preset value; and controlling the vehicle to stop at the preset distance from the intersection, until determining that the other vehicle clears the intersection.

The vehicle may be prevented from entering the intersection in response to the driving information being one of less than and equal to the preset value.

The method may further include: identifying a traffic light in front of the vehicle from a captured image using a camera; calculating a distance from a ground to the traffic light based on a size of the traffic light; and calculating a limit position on a road at which a signal of the traffic light at the intersection may be identifiable based on the distance from the ground to the traffic light and a field of view (FOV) of the camera.

A tilting angle of the camera may be fixed.

A limit position at which the camera may be configured to capture a traffic light may be calculated based on a height of a pole of the traffic light and the FOV of the camera.

One of the distance from the ground to the traffic light and the height of the pole of the traffic light may be calculated using the captured image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
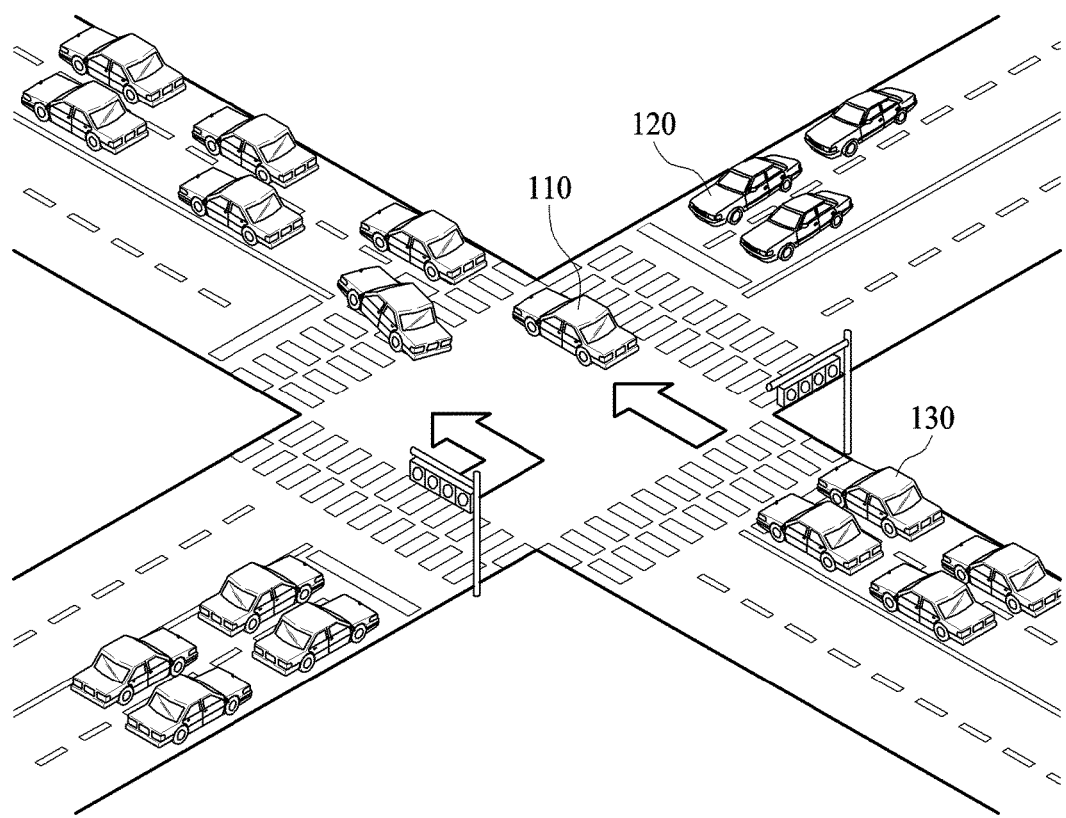
FIG. 1 illustrates an example of a vehicle tailgating at an intersection.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the term "and/or" includes any one and any combination of any two or more of the associated listed items.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Unless otherwise defined, all terms including technical and scientific terms used herein have the same meaning as commonly understood after an understanding of the disclosure of this application. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a vehicle tailgating at an intersection.

Referring to FIG. 1, a vehicle 130 is an autonomous vehicle. An autonomous vehicle drives in a self-driven mode in view of a recognized driving environment and road conditions, with little or no input is provided from a driver. The driving environment is recognized through at least one sensor attached to or installed on the autonomous vehicle. For example, the at least one sensor includes a global positioning system (GPS), a camera, a LIDAR, a RADAR, and voice recognition sensors. However, examples are not limited thereto. The driving environment includes a road, a condition of the road, a traffic signal, types of lanes, ambient conditions, a distance from a close vehicle, weather, and any obstacles. However, examples are not limited thereto.

The autonomous vehicle recognizes the driving environment, and generates an autonomous driving route suitable for the driving environment. The autonomous vehicle controls internal and external mechanical elements to follow the autonomous driving route. The autonomous vehicle periodically recalculates and generates the autonomous driving route to ensure that the autonomous driving route is in accord with any changes in the driving environment. Further, the autonomous vehicle generates the autonomous driving route using a rule based model. For example, conditions that the autonomous vehicle must comply with are preset, and the autonomous vehicle generates an optimal autonomous driving route satisfying the conditions. For example, one of the conditions is to obey traffic regulations. Another example of the conditions is to not tailgate at an intersection for a smooth traffic situation.

When a vehicle 110 enters an intersection on a traffic signal and a traffic situation in a proceeding direction is not smooth, the vehicle 110 will obstruct a path of a vehicle 120 proceeding in another direction. Such an action of the vehicle 110 is referred to as tailgating at an intersection.

In a case in which the traffic situation at the intersection is congested, tailgating at the intersection is a further problem when the vehicle 130 enters the intersection despite a traffic signal for the proceeding direction of the vehicle 130 corresponds to a proceed signal. Hereinafter, a method of controlling driving of a vehicle to prevent tailgating of the vehicle at an intersection will be described in detail with reference to FIGS. 2 through 11.

Figure 2:
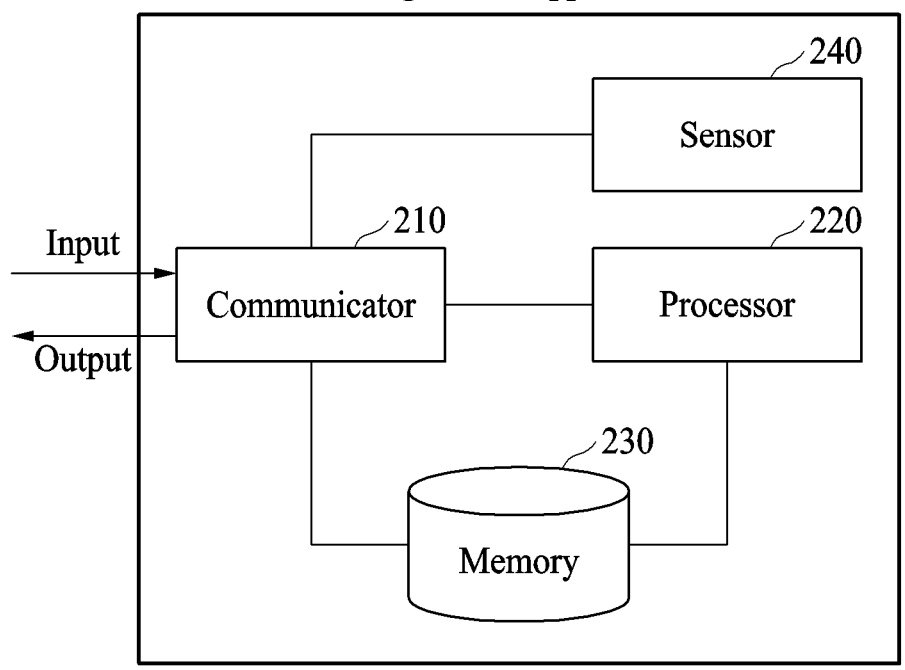
FIG. 2 illustrates an example of a configuration of an apparatus to control driving of a vehicle.

FIG. 2 illustrates an example of a configuration of an apparatus for controlling driving of a vehicle.

Referring to FIG. 2, an apparatus 200 for controlling driving of a vehicle, hereinafter, the driving control apparatus 200, includes a communicator 210, a processor 220, a memory 230, and a sensor 240. The driving control apparatus 200 is included in the vehicle 130 of FIG. 1. The driving control apparatus 200 is an apparatus configured to process data.

The communicator 210 is operatively connected to the processor 220, the memory 230, and the sensor 240 and transmits or receives data to and from the processor 220, the memory 230, and the sensor 240. The communicator 210 is also connected to an external device and transmits or receives data to and from the external device. The communicator 210 is implemented using a circuitry in the driving control apparatus 200. For example, the communicator 210 includes an internal bus and an external bus. In another example, the communicator 210 is a structural element configured to connect the driving control apparatus 200 to the external device. The communicator 210 is an interface. The communicator 210 receives data from the external device, and transmits the data to the processor 220 and the memory 230.

The processor 220 processes the data received by the communicator 210 and data stored in the memory 230.

The term "processor" refers to a data processor implemented as hardware having a circuit physically structured to perform desired operations. For example, the desired operations include codes or instructions included in a program. The data processor implemented as hardware includes a microprocessor, a central processor, a processor core, a multi-core processor, a multiprocessor, an application-specific integrated circuit (ASIC), and a field programmable gate array (FPGA).

The processor 220 executes computer-readable codes, for example, software, stored in a memory, for example, the memory 230, and instructions triggered by the processor 220.

The memory 230 stores the data received by the communicator 210 and the data processed by the processor 220. For example, the memory 230 stores the program.

The memory 230 includes any one or any combination of a volatile memory, a non-volatile memory, a random access memory (RAM), a flash memory, a hard disk drive, and an optical disk drive.

The memory 230 stores an instruction set, for example, software, to control driving of a vehicle. The instruction set is executed by the processor 220. The processor 220 controls driving of a vehicle based on the instruction set.

The sensor 240 includes a GPS, a camera, a LIDAR, a RADAR, and voice recognition sensors. However, examples are not limited thereto. For example, the camera generates a front side image with respect to the vehicle by capturing another vehicle in front of the vehicle. The camera is installed on the vehicle such that a plane of an image captured by the camera is perpendicular to the ground.

Hereinafter, the communicator 210, the processor 220, the memory 230, and the sensor 240 will be described further with reference to FIGS. 3 through 11.

Figure 3:
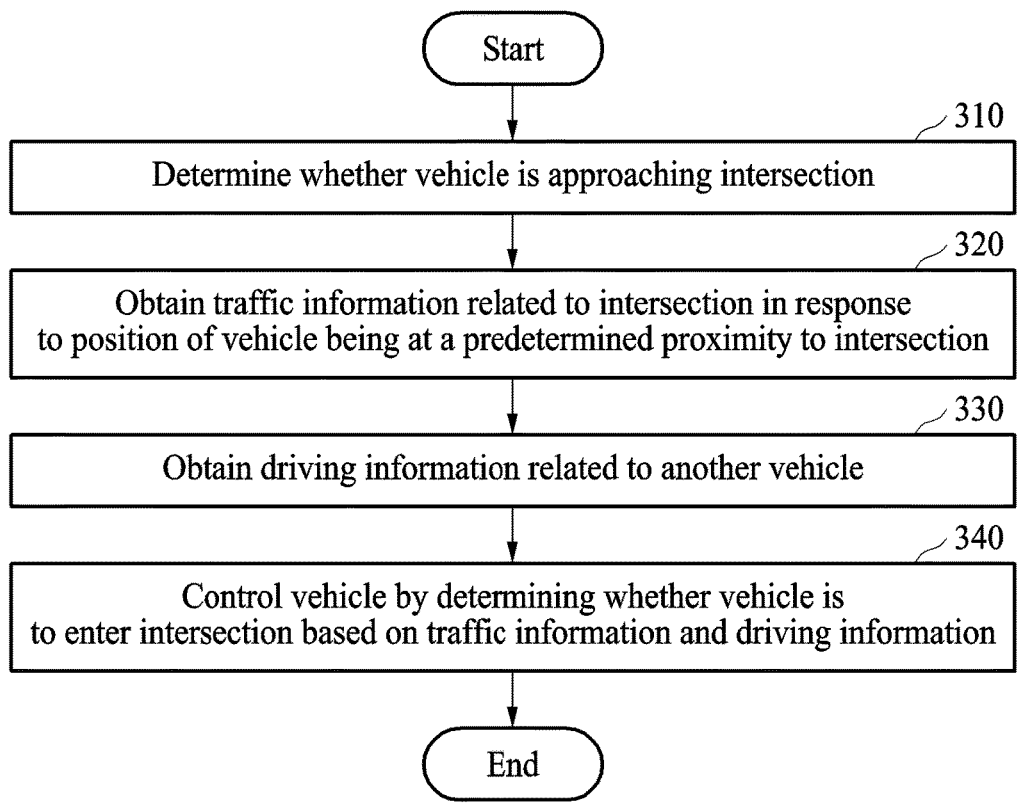
FIG. 3 illustrates an example of a method to control driving of a vehicle.

FIG. 3 illustrates an example of a method to control driving of a vehicle.

Operations 310 through 340 are performed by the driving control apparatus 200 of FIG. 2. A vehicle includes the driving control apparatus 200.

Referring to FIG. 3, in operation 310, the processor 220 determines whether the vehicle is approaching an intersection. In one example, the intersection is a three-way intersection or a four-way intersection. However, examples are not limited thereto. The intersection is a location in which a road of a proceeding direction of a vehicle and a road of another direction cross. The example of determining whether the vehicle is approaching the intersection will be described further with reference to FIG. 4.

In operation 320, the processor 220 obtains traffic information related to the intersection in response to a position of the vehicle being at a predetermined proximity to the intersection. Such predetermined proximity is a position in which the vehicle is at a pre-defined distance from the intersection. Such pre-defined distance can be from at least one foot from the intersection to a position adjacent to, next to, or at which one side of crossroads occur. The traffic information includes a traffic signal and a traffic sign. The vehicle needs to be controlled to not violate the traffic information. Thus, in a case in which the obtained traffic information indicates a stop signal, the vehicle is controlled to not enter the intersection using a general autonomous driving route generation method. In a case in which the traffic information indicates a proceed signal, information related to an ambient condition surrounding the vehicle is obtained to determine whether the vehicle is to enter the intersection.

In operation 330, the processor 220 obtains driving information related to another vehicle in front of the vehicle. The processor 220 obtains the driving information related to the other vehicle using the camera, the LIDAR, or the RADAR. For example, the other vehicle is a vehicle positioned on the same lane as the vehicle. The other vehicle is a vehicle entering the intersection, in front of the vehicle, and on an opposite or another side of the intersection.

The driving information related to the other vehicle is an absolute speed or an absolute velocity of the other vehicle. The driving information related to the other vehicle is a relative speed or a relative velocity between the vehicle and the other vehicle. An absence of the other vehicle is also obtained as the driving information.

In operation 340, the processor 220 controls the vehicle by determining whether the vehicle is to enter the intersection based on the traffic information and the driving information, which includes one of the absolute speed of the other vehicle, the absolute velocity of the other vehicle, and the relative speed between the vehicle and the other vehicle being less than a preset value. In response to determining that the vehicle is to enter the intersection, the processor 220 generates an autonomous driving route passing through the intersection, and controls the vehicle to drive along the generated autonomous driving route. In response to determining that the vehicle is to not enter the intersection, the processor 220 controls the vehicle to stop on the road, at the predetermined proximity from the intersection, until it is determined that the other vehicle has cleared the intersection and it is permissible for the vehicle to enter the intersection. The processor 220 also determines a position at which the vehicle is to stop on the road. The example of determining whether the vehicle is to enter the intersection will be described further with reference to FIG. 5.

Figure 4:
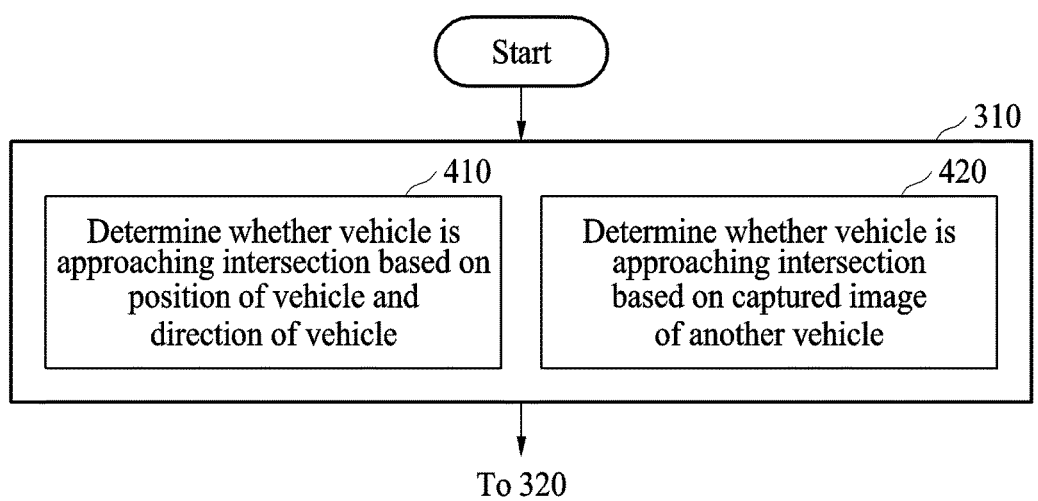
FIG. 4 illustrates an example of determining whether a vehicle is approaching an intersection.

FIG. 4 illustrates an example of determining whether a vehicle is approaching an intersection.

Referring to FIG. 4, operation 310 of FIG. 3 includes operations 410 and 420.

In operation 410, the processor 220 determines whether the vehicle is approaching the intersection based on a position of the vehicle and a direction of the vehicle. For example, the processor 220 determines whether the vehicle is approaching the intersection using a map indicating information of a road stored in the memory 230. A position of the vehicle on the map is detected based on a global positioning system (GPS) position of the vehicle obtained from GPS information. The processor 220 determines whether the vehicle is approaching an intersection on the map based on the position of the vehicle and a proceeding direction of the vehicle. In a case in which the GPS position of the vehicle is within the predetermined proximity from the intersection on the map, and a distance between the GPS position of the vehicle and the intersection decreases, the processor 220 determines that the vehicle is approaching the intersection on the map.

In operation 420, the processor 220 determines whether the vehicle is approaching the intersection based on a captured image of another vehicle. The camera of the sensor 240 generates a front side image of the vehicle by capturing the image of the other vehicle. The processor 220 identifies an intersection in the front side image. In an example in which a road of the proceeding direction of the vehicle and a road of a different proceeding direction cross, the processor 220 determines a place of the crossing to be the intersection. The processor 220 determines a place without a center line to be the intersection. In an example in which a direction of an outermost line of a driving lane is different from a direction of a center line, the processor 220 determines a place at which the direction of the outermost line changes to be the intersection. The processor 220 identifies the intersection based on the traffic sign.

In an aspect, one of operations 410 and 420 is performed. In another aspect, both of operations 410 and 420 are performed, and the processor 220 determines whether the vehicle is approaching the intersection based on results of operations 410 and 420. In an example in which at least one of the results of operations 410 and 420 indicates that the vehicle is approaching the intersection, the processor 220 determines that the vehicle is approaching the intersection.

Figure 5:
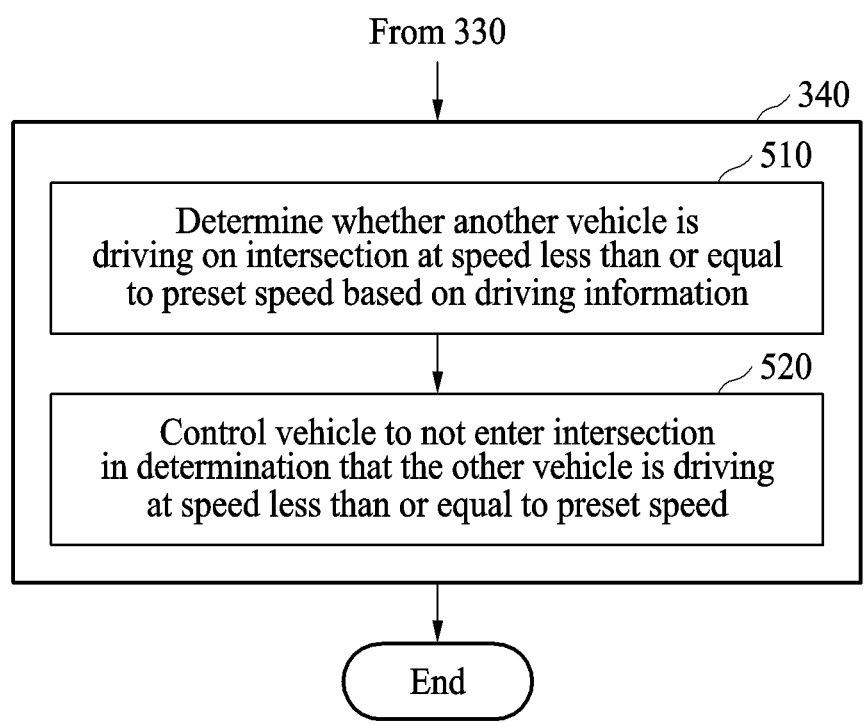
FIG. 5 illustrates an example of controlling a vehicle to not enter an intersection.

FIG. 5 illustrates an example of controlling a vehicle to not enter an intersection.

Referring to FIG. 5, operation 340 of FIG. 3 includes operations 510 and 520.

In operation 510, the processor 220 determines whether the other vehicle is driving on the intersection at a speed or velocity less than or equal to a preset speed or velocity based on the driving information related to the other vehicle. The processor 220 determines whether a relative speed or relative velocity between the vehicle and the other vehicle is less than or equal to a preset speed or velocity.

In operation 520, the processor 220 controls the vehicle not to enter the intersection in response to determining that the front side vehicle is driving at a speed or velocity less than or equal to the preset speed or velocity. The processor 220 prevents or controls the vehicle not to enter the intersection in response to determining that the relative speed or relative velocity between the vehicle and the other vehicle is less than or equal to the preset speed or velocity. The processor 220 controls the vehicle not to enter the intersection in upon a decrease in the relative speed or relative velocity between the vehicle and the other vehicle is greater than or equal to a preset decrease.

To control the vehicle not to enter the intersection, the processor 220 determines a position at which the vehicle is to stop on the road. The example of determining the stop position of the vehicle will be described further with reference to FIGS. 6 through 11.

Figure 6:
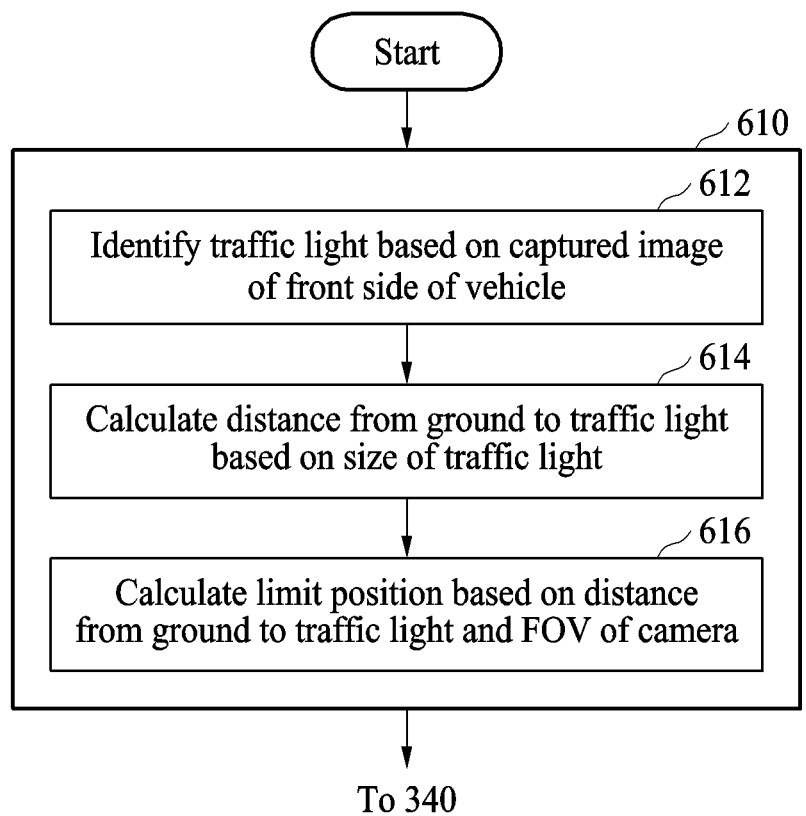
FIG. 6 illustrates an example of calculating a limit position on a road at which a signal of a traffic light is identifiable.

FIG. 6 illustrates an example of calculating a limit position on a road at which a signal of a traffic light is identifiable.

Operation 610 is performed before operation 340 of FIG. 3 is performed. For example, operation 610 is performed in parallel with operations 310 through 330 of FIG. 3.

Referring to FIG. 6, operation 610 includes operations 612, 614, and 616.

In operation 612, the processor 220 identifies a traffic light in a captured image of a front side of the vehicle based on the image. For example, the processor 220 identifies the traffic light from the image using a database stored in the memory 230. The database includes information related to a plurality of traffic lights. The traffic light indicates a traffic signal with respect to the proceeding direction of the vehicle.

The traffic light identified in operation 612 and the traffic signal is a portion of the traffic information of operation 320.

In operation 614, the processor 220 calculates a distance from the ground to the traffic light based on a size of the traffic light. The example of calculating the distance from the ground to the traffic light will be described further with reference to FIGS. 8 and 9.

In operation 616, the processor 220 calculates a limit position on the road at which a signal of the traffic light at the intersection is identifiable based on the distance from the ground to the traffic light and a field of view (FOV) of the camera. The camera is a camera used to capture the front side of the vehicle. The example of calculating the limit position will be described further with reference to FIG. 7.

Figure 7:
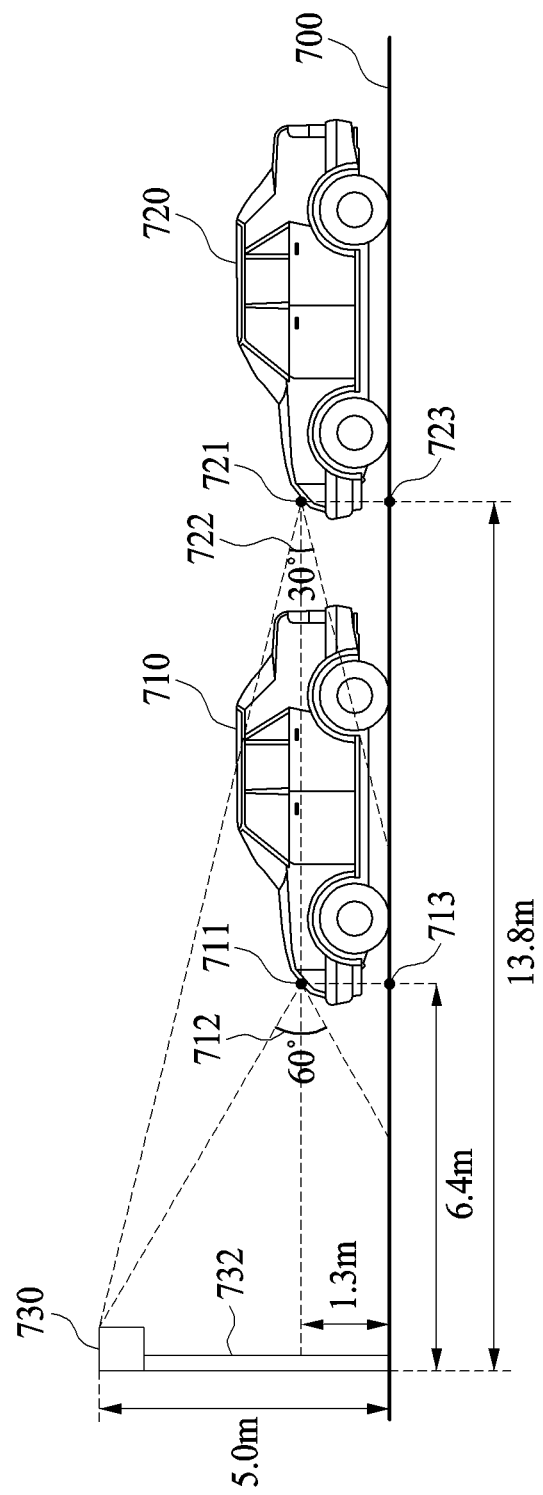
FIG. 7 illustrates an example of a limit position calculated based on a field of view (FOV) of a camera.

FIG. 7 illustrates an example of a limit position calculated based on an FOV of a camera.

A tilting angle of a camera 711 configured to capture a front side of a vehicle 710 is fixed. The tilting angle is an angle of inclination of an axis of the camera 711 with respect to a horizontal plane 700. For example, the camera 711 has an FOV 712 of 60 degrees. The FOV 712 is a size of a region to be captured by the camera 711 at a time using an angle.

A limit position 713 at which the camera 711 is able to capture a traffic light 730 is calculated based on a height of a pole 732 of the traffic light 730 and the FOV 712 of the camera 711. For example, in a case in which the tilting angle of the camera 711 is parallel with the horizontal line 700, the FOV 712 of the camera 711 is 60 degrees, a distance from the ground to the camera 711 is 1.3 meters (m), and the height of the pole 732 is 5.0 m, the limit position 713 at which the camera 711 is able to capture the traffic light 730 is calculated to be a position which is 6.4 m apart from a position of the pole 732.

In another example, in a case in which an FOV 722 of a camera 721 of a vehicle 720 is 30 degrees, a limit position 723 at which the camera 721 is able to capture the traffic light 730 is calculated to be a position which is 13.8 m apart from the position of the pole 732.

In the above examples, to calculate the limit position 713 of the vehicle 710 or the limit position 723 of the vehicle 720, the distance from the ground to the traffic light 730 or the height of the pole 732 of the traffic light 730 is needed.

The distance from the ground to the traffic light 730 or the height of the pole 732 of the traffic light 730 is calculated using a front side image captured by the vehicle 710 or 720. The example of calculating the height of the pole 732 of the traffic light 730 will be described further with reference to FIG. 8.

Figure 8:
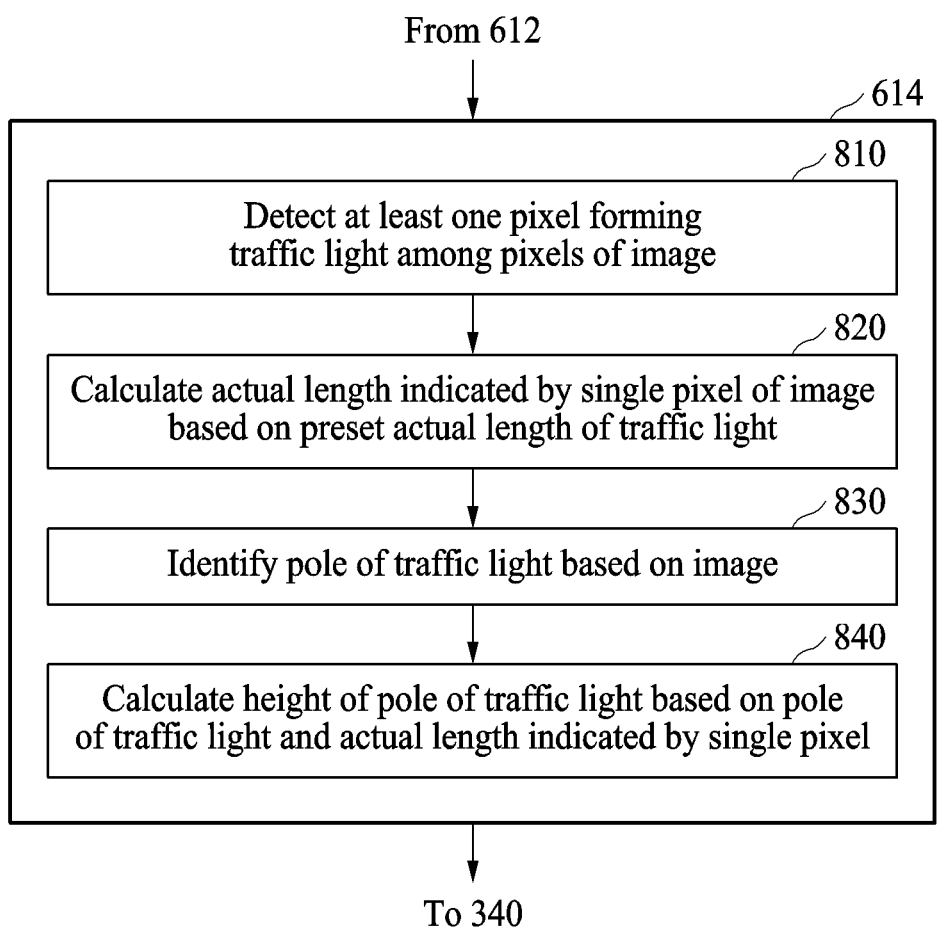
FIG. 8 illustrates an example of calculating an actual distance from the ground to a traffic light.

FIG. 8 illustrates an example of calculating an actual distance from the ground to a traffic light.

Referring to FIG. 8, operation 614 of FIG. 6 includes operations 810 through 840.

In operation 810, the processor 220 detects at least one pixel forming the identified traffic light, among pixels of the captured image.

In operation 820, the processor 220 calculates an actual length indicated by a single pixel of the image based on a preset actual length of the traffic light. In an example, the preset actual length of the traffic light is a length of the traffic light preset in a real time or real world. An actual length of the traffic light corresponding to the identified traffic light among a plurality of traffic light is used. For example, an actual length of the traffic light being 1 meter (m) and 100 pixels forming the traffic light in a horizontal direction, the actual length indicated by the single pixel is 1 centimeter (cm).

In operation 830, the processor 220 identifies a pole of the traffic light based on the captured image. The processor 220 identifies a pole connected to the identified traffic light as the pole of the traffic light.

In operation 840, the processor 220 calculates a height of the pole of the traffic light based on the pole of the identified traffic light and the actual length indicated by the single pixel. The calculated height of the pole of the traffic light is an actual height. In an example in which 500 pixels form the pole in a vertical direction and the actual length indicated by the single pixel is 1 cm, the height of the pole is 5 m. The height of the pole corresponds to the distance from the ground to the traffic light.

Figure 9:
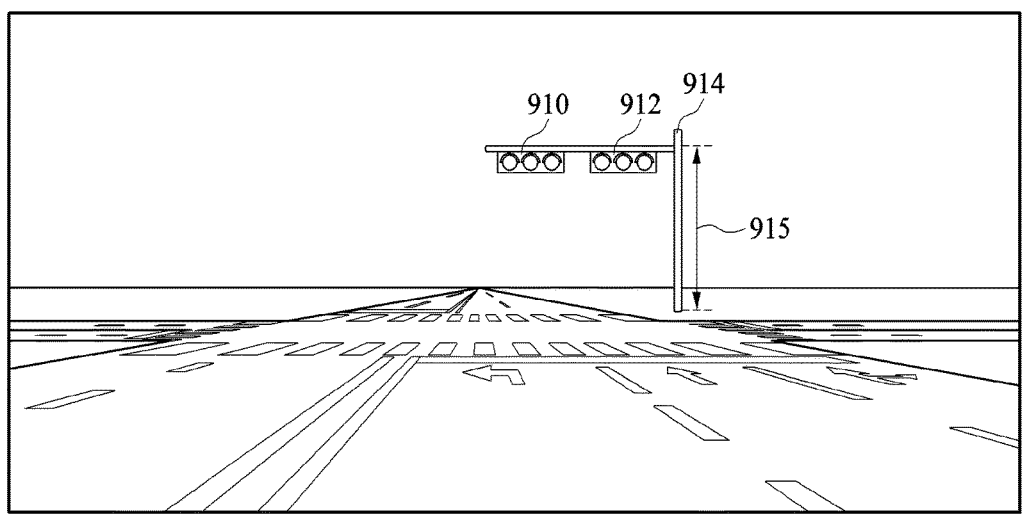
FIG. 9 illustrates an example of a captured image of a front side of a vehicle.

FIG. 9 illustrates an example of a captured image of a front side of a vehicle.

Referring to FIG. 9, a vehicle generates an image 900 by capturing a front side of the vehicle. The processor 220 identifies traffic lights 910 and 912 in the image 900. The processor 220 calculates an actual length indicated by a single pixel of the image 900 based on actual lengths of the identified traffic lights 910 and 912.

The processor 220 identifies a pole 914 of the traffic lights 910 and 912 in the image 900. The processor 220 identifies a portion 915 of the pole 914 corresponding to a distance from the ground to the traffic lights 910 and 912, and calculates a height of the portion 915. The height of the portion 915 corresponds to the distance from the ground to the traffic lights 910 and 912.

The processor 220 calculates a limit position on a road at which the vehicle is able to identify a signal of the traffic lights 910 and 912 based on the distance from the ground to the traffic lights 910 and 912 and an FOV of a camera of the vehicle.

Figure 10:
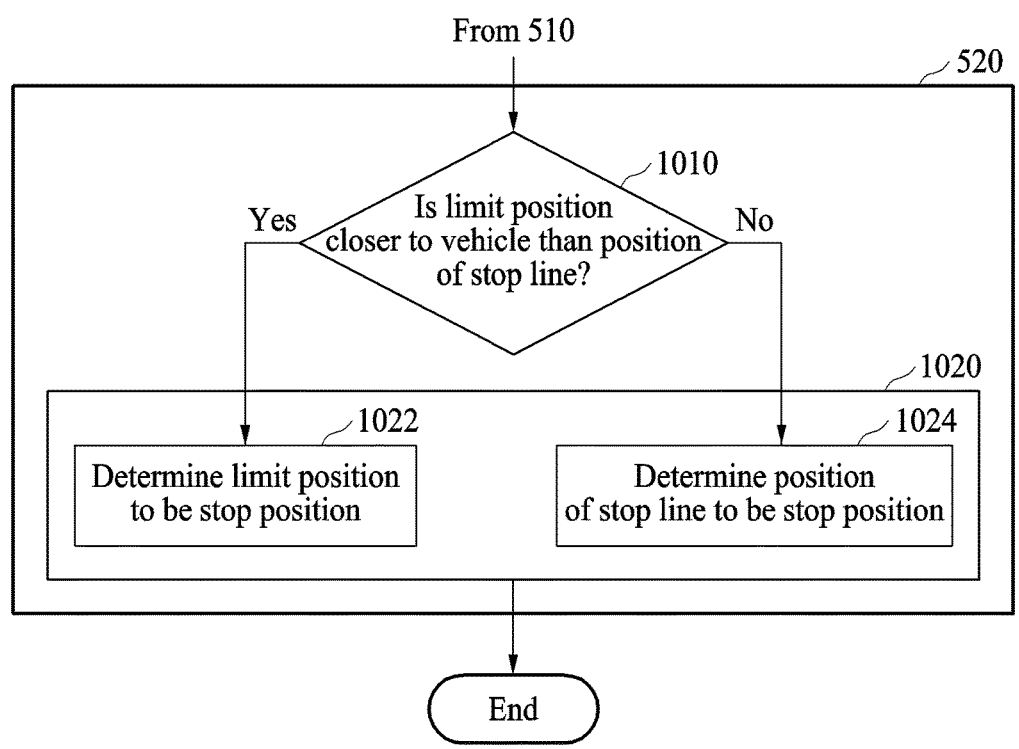
FIG. 10 illustrates an example of determining a stop position of a vehicle.

FIG. 10 illustrates an example of determining a stop position of a vehicle.

Referring to FIG. 10, operation 520 of FIG. 5 includes operations 1010 and 1020.

In operation 1010, the processor 220 determines whether the limit position described with reference to FIGS. 6 through 9 is closer to the vehicle than a position of a stop line on the road.

In operation 1020, the processor 220 determines a stop position of the vehicle based on a result of the determination. Operation 1020 includes operations 1022 and 1024.

In operation 1022, the processor 220 determines the limit position to be the stop position in response to determining that the limit position is closer to the vehicle than the position of the stop line.

In operation 1024, the processor 220 determines the position of the stop line to be the stop position in response to determining that the position of the stop line is closer to the vehicle than the limit position.

Figure 11:
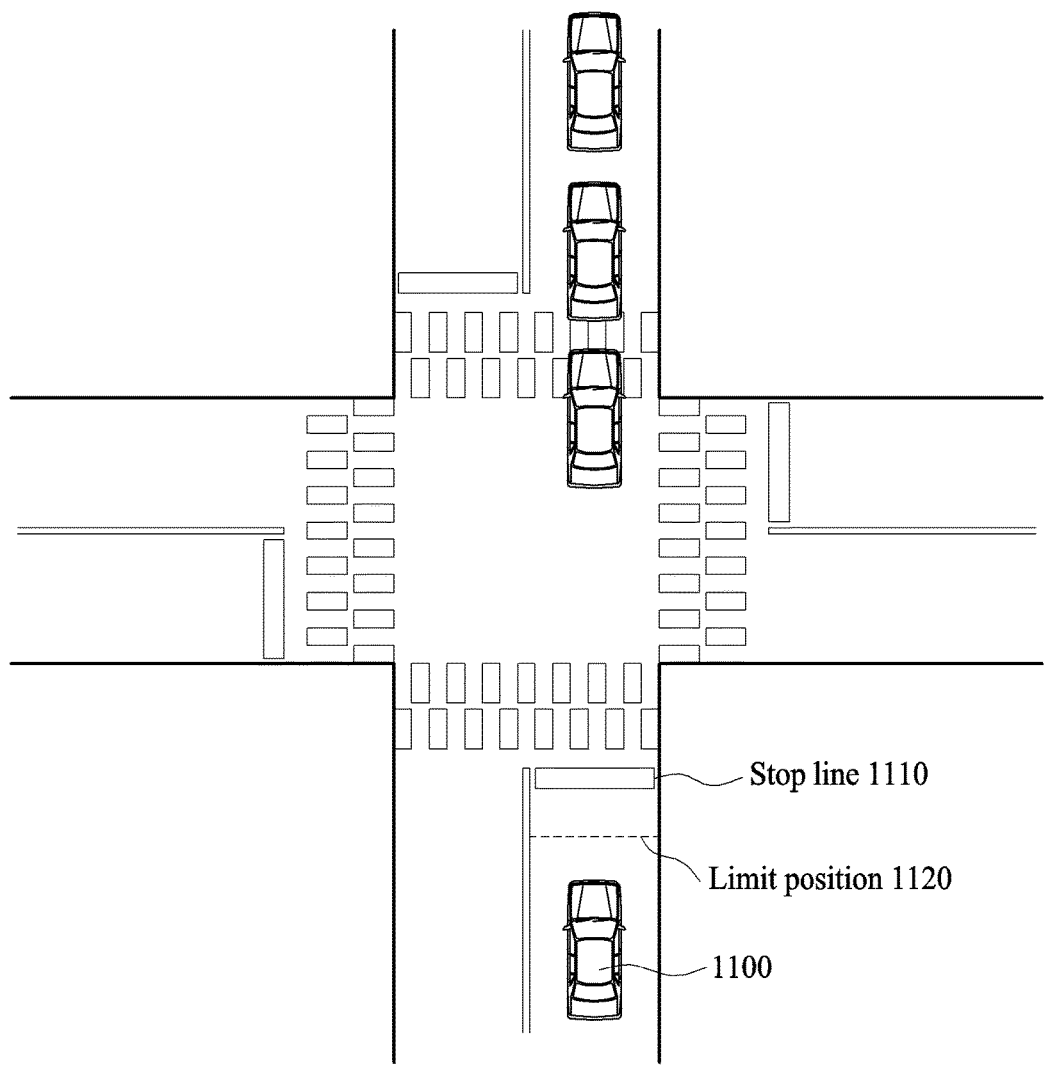
FIG. 11 illustrates an example of a stop position of a vehicle.

FIG. 11 illustrates an example of a stop position of a vehicle.

Referring to FIG. 11, a vehicle 1100 includes the driving control apparatus 200. The driving control apparatus 200 determines whether the vehicle 1100 is to enter an intersection in response to the vehicle 1100 being adjacent to the intersection. In response to determination that the vehicle is to not enter the intersection, the driving control apparatus 200 determines a stop position on a road, and controls the vehicle 1100 to stop at the determined stop position.

The driving control apparatus 200 determines a position of a stop line 1110, and determines a limit position 1120 on the road at which a signal of a traffic light is identifiable. Because the limit position 1120 is closer to the vehicle 1100 than the position of the stop line 1110, the driving control apparatus 200 determines the limit position 1120 to be the stop position. The driving control apparatus 200 controls the vehicle 1100 to stop at the limit position 1120.

In response to determining that the vehicle 1100 is to enter the intersection, the driving control apparatus 200 controls the vehicle 1100 to enter the intersection.

The driving control apparatus 200 in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-6, 8, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to control driving of a vehicle, comprising:
   obtaining traffic information related to an intersection the vehicle approaches, wherein the traffic information comprises information about a traffic signal that controls vehicles passing through the intersection;
   determining a minimum distance of the vehicle from the intersection at which the traffic signal is identifiable within an image of the traffic signal captured by a camera of an autonomous control system of the vehicle, wherein the determining comprises:
      capturing the image of the traffic signal using the camera of the autonomous control system of the vehicle;
      determining a distance from ground to the traffic signal based on the traffic signal in the image; and
      calculating the minimum distance based on the distance from ground to the traffic signal and a field of view (FOV) of the camera; and
   controlling the vehicle to enter the intersection beyond the minimum distance if the traffic signal indicates to pass through the intersection and stop the vehicle at the minimum distance if the traffic signal indicates to stop at the intersection.

2. The method of claim 1, wherein the controlling comprises:
   controlling the vehicle to enter the intersection and stop the vehicle by the minimum distance based on a speed of another vehicle traveling in front of and in a same direction as the vehicle.

3. The method of claim 2, wherein the other vehicle is traveling in a lane that is the same as a lane in which the vehicle is traveling.

4. The method of claim 1, wherein determining the distance from the ground to the traffic signal comprises:
   calculating the distance from the ground to the traffic signal based on a size of the traffic signal in the image.

5. The method of claim 4, wherein calculating the distance from the ground to the traffic signal comprises:
   detecting a pixel of the traffic signal from among pixels of the image;
   calculating an actual length indicated by a single pixel of the image based on a preset actual length of the traffic signal;
   identifying a pole of the traffic signal based on the image; and
   calculating a height of the pole of the traffic signal based on the pole of the traffic signal in the image and the actual length indicated by the single pixel.

6. The method of claim 1, further comprising:
   determining whether the vehicle is approaching the intersection, wherein the determining of whether the vehicle is approaching the intersection comprises either one or both of:
      determining whether the vehicle is approaching the intersection based on a position of the vehicle and a proceeding direction of the vehicle; and
      determining whether the vehicle is approaching the intersection based on a captured image of a front side of the vehicle.

7. A non-transitory computer-readable storage medium storing instructions that, when executed by a processor, cause the processor to perform the method of claim 1.

8. An apparatus to control driving of a vehicle, comprising:
   a processor configured to:
      obtain traffic information related to an intersection the vehicle approaches, wherein the traffic information comprises information about a traffic signal that controls vehicles passing through the intersection;
      determine a minimum distance of the vehicle from the intersection at which the traffic signal is identifiable within an image of the traffic signal captured by a camera of an autonomous control system of the vehicle by:
         capturing the image of the traffic signal using the camera of the autonomous control system of the vehicle;
         determining a distance from ground to the traffic signal based on the traffic signal in the image; and
         calculating the minimum distance based on the distance from ground to the traffic signal and a field of view (FOV) of the camera; and
      control the vehicle to enter the intersection beyond the minimum distance if the traffic signal indicates to pass through the intersection and stop the vehicle at the minimum distance if the traffic signal indicates to stop at the intersection.

9. The apparatus of claim 8, wherein the controlling comprises:
   controlling the vehicle to not-enter the intersection and stop the vehicle by the minimum distance based on a speed of another vehicle traveling in front of and in a same direction as the vehicle.

10. The apparatus of claim 9, wherein the other vehicle is traveling in a lane that is the same as a lane in which the vehicle is traveling.

11. The apparatus of claim 8, wherein the processor is configured to determine the distance from the ground to the traffic signal by:
    calculating the distance from the ground to the traffic signal based on a size of the traffic signal in the image.

12. The apparatus of claim 11, wherein the processor is configured to calculate the distance from the ground to the traffic signal by:
    detecting a pixel of the traffic signal from among pixels of the image;
    calculating an actual length indicated by a single pixel of the image based on a preset actual length of the traffic signal;

identifying a pole of the traffic signal based on the image; and calculating a height of the pole of the traffic signal based on the pole of the traffic signal in the image and the actual length indicated by the single pixel.

13. The apparatus of claim 8, further comprising:

a memory configured to store computer-readable instructions, which when executed by the processor cause the processor to control driving of the vehicle.

14. The method of claim 1, further comprising:

obtaining driving information related to another vehicle in front of the vehicle, wherein the driving information comprises one of an absolute speed of the other vehicle, an absolute velocity of the other vehicle, and a relative speed between the vehicle and the other vehicle, and wherein the controlling the vehicle further comprises:
   determining whether the other vehicle clears the intersection based on the driving information; and
   controlling the vehicle to stop by the minimum distance from the intersection if the traffic signal indicates to pass through the intersection, until the other vehicle clears the intersection.

\* \* \* \* \*